March 10, 1942.   R. P. LOWRY   2,276,237
APPARATUS FOR MIXING CEMENT
Filed March 21, 1941
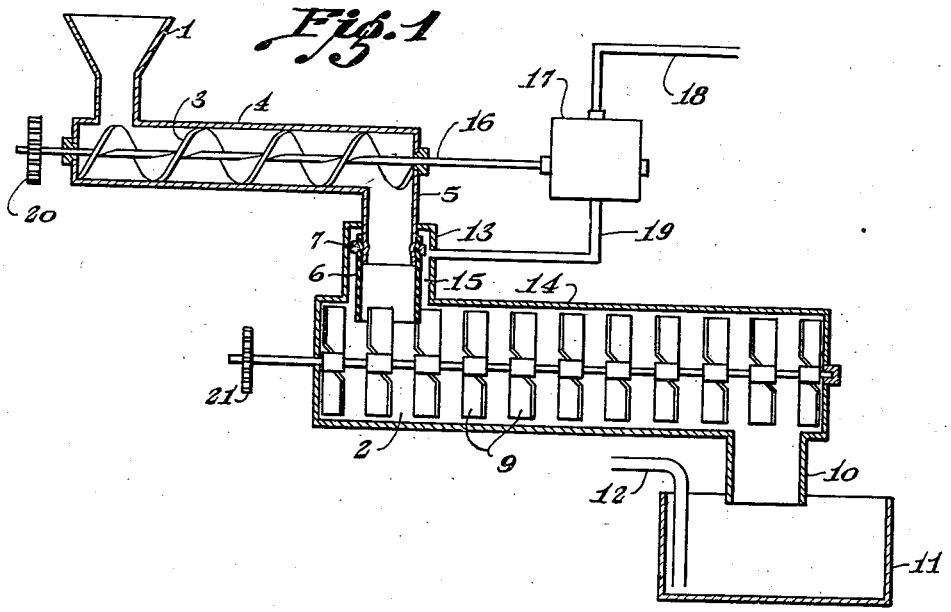
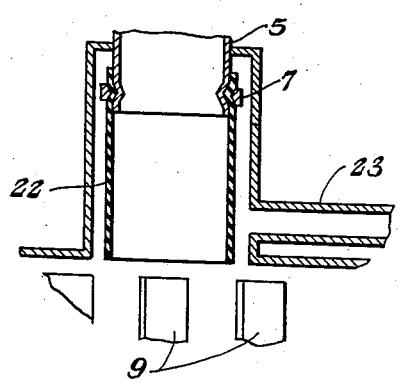
INVENTOR
RONALD P. LOWRY
BY
Griswold & Burdick
ATTORNEYS Patented Mar. 10, 1942

2,276,237

UNITED STATES PATENT OFFICE 2,276,237

APPARATUS FOR MIXING CEMENT

Ronald P. Lowry, Midland, Mich., assignor to The Dow Chemical Company, Midland, Mich., a corporation of Michigan Application March 21, 1941, Serial No. 384,457

5 Claims. (Cl. 259—151)

The invention relates to an improvement in cement mixers. It more particularly concerns an improved mixing apparatus for use in making a uniform cement slurry from water and cement powder such as is used in cementing operations in oil wells and the like.

In cement mixers of the type where large volumes of cement powder and water are brought together and intimately mixed in a very short period of time, such as is often the case in cementing oil wells, it oftentimes happens that difficulty is encountered at the point in the operation where the cement powder and water are brought together. This difficulty appears to be due to the fact that some of the cement powder fails to get thoroughly moistened and tends to form a cake which gradually builds up at the point of entrance of the powder and water until additional cement powder and/or water cannot be properly introduced into the mixing chamber.

It is, therefore, the principal object of the invention to provide a cementing apparatus adapted to mix large quantities of powdered cement and water without any difficulty due to the cement caking up so as to prevent or obstruct the entry of either cement powder or water into the mixing chamber. Other objects and advantages will be apparent as the description of the invention proceeds.

My invention resides in the discovery that by providing the lower end of the conduit through which the cement powder is being introduced into the mixing chamber with a flexible resilient end portion which is arranged so that it is contacted and flexed intermittently, a cement cake is prevented from forming and building up so as to obstruct the entry of either water or cement powder into the mixing chamber.

In the accompanying drawing forming a part of this specification and which illustrates the invention:

Fig. 1 is a cross-sectional view in side elevation of my new and improved cement mixing apparatus.

Fig. 2 is a fragmentary sectional view taken about the lower end of cement conduit showing a modification of this portion of the structure.

Referring to Fig. 1, hopper 1 provides a suitable receptacle into which the cement powder may be dumped for forwarding to the mixing chamber 2 as by means of screw conveyer 3 positioned in housing 4. The end of housing 4 is provided with a spout 5 through which the cement powder being forwarded drops on its way to the mixing chamber 2. A flexible tubular rubber conduit member 6 is secured to the lower end of spout 5 as by means of clamping band 7 placed about a groove in the lower end of the spout 5. The flexible conduit 6 extends into the mixing chamber a sufficient distance to make contact with the mixing blades or agitating paddles 9. The agitating blades are so arranged as to give the water and cement powder a thorough mixing and at the same time forward it through the mixer to the discharge port 10. The cement slurry discharging from the mixing chamber is caught in the tank 11 and forwarded to the place of use through pipe 12 connected to a suitable pump (not shown). The spout 5 is surrounded by a tubular member 13 extending upwardly from the mixer housing 14. The tubular member 13 defines an annular enclosed chamber 15 around the spout 5 and serves as a chamber into which water flows prior to entering the mixing chamber. The shaft 16 acting to drive the screw conveyer is also connected to a suitable water metering pump 17, such as a gear pump. The pump intake communicates with a water supply tank (not shown) through pipe 18 while the pump discharge communicates with the annular chamber 15 about spout 5 through pipe 19. Suitable gears or sprockets 20 and 21 are secured to the screw conveyer shaft and to the mixing paddle shaft, respectively, serving as a means whereby these shafts may be connected to a power source and rotated.

In the modification shown in Fig. 2 a flexible tubular rubber conduit 22 is attached to the end of spout 5 in the manner shown in Fig. 1. However, the length of the tubular rubber member 22 is such that it does not extend into the mixing chamber to a point where it contacts the mixing paddles 9. As a means of providing the necessary flexing of the rubber conduit a water line 23 of suitable diameter is led into the chamber surrounding the rubber conduit at a point adjacent the rubber member. The water flowing rapidly through the water line hits the rubber member with enough pressure to provide the necessary flexing of the rubber conduit.

In the operation of the apparatus shown in Fig. 1 to produce a water-cement slurry, cement powder is started to the mixing chamber by operating the screw conveyer. At the same time water is forwarded to the mixing chamber and the agitating paddles in the mixing chamber are started. The cement powder drops into the mixing chamber 2 through spout 5 while water enters the chamber 15 and falls into the mixing chamber about the flexible rubber element 6.

The mixing paddles 9 intermittently contact and flex the end of the rubber cement conduit 6 and thus prevent any slightly moistened cement caking up about the end of the spout at the point where water and cement powder first come into contact. In this manner the possibility of the cement spout clogging up, or of a cement cake building up in the annular water chamber 15 is entirely eliminated and the rate at which slurry is produced can be varied widely without any difficulty due to clogging of the water or cement inlet.

In case the modification illustrated in Fig. 2 is employed it will be desirable to supply water to the mixer at such a rate that it will develop the necessary pressure required to flex the rubber conduit. Such pressures will be readily attained at moderate rates of operation by providing a water conduit of suitable diameter.

While rubber has been found to be a highly suitable material for the flexible member 6, the material may be cord reinforced rubber, flexible metal conduit, or any of the commonly known synthetically manufactured rubber-like materials such as the commonly known "Neoprene" and "Thiokol."

It will be found generally desirable to employ a water metering device of the positive displacement type. A device of the proper capacity characteristics may be selected whereby for any given rate of rotation of the screw conveyer a proper and desirable quantity of water is also forwarded to the mixing chamber.

Although the cement forwarding means employed is preferably a screw conveyer because of its desirable metering characteristics, other means of forwarding the cement may also be employed. For example, a bucket conveyer, rotary valve, or the like, may be suitably employed.

It is also to be understood that any of the conventionally known mixers wherein water and cement powder are introduced into a mixing chamber at closely adjacent points may be employed instead of the forms illustrated.

The foregoing improved means for conducting cement powder into a cement mixer wherein it is brought into intimate contact with water has been found to be highly advantageous over the conventionally employed apparatus. It allows continuous use of the apparatus without the necessity of an occasional shut down for a cleanout operation by entirely preventing insufficiently moistened cement powder from building up at the point of entry of cement and water where it might entirely stop the operation of the mixer or greatly curtail its capacity.

I claim:

1. In a cement mixer the combination of a mixing chamber having an inlet and an outlet, agitating means arranged within the mixing chamber, a conduit for cement powder having the lower end thereof formed of flexible material communicating with the mixing chamber, means arranged to flex the lower end of the flexible conduit, and means to deliver water to the mixing chamber.

2. In a cement mixer for producing a slurry from water and cement powder the combination which includes a mixing chamber having an inlet and an outlet, agitating and forwarding means arranged within the mixing chamber, a screw conveyer communicating with the mixing chamber inlet through a conduit having the lower end thereof formed of a rubber-like material, means arranged to flex the rubber-like portion of the conduit, and water metering means adapted to deliver water to the mixing chamber at a point near the rubber-like portion of the conduit.

3. In a cement mixer for the production of a cement-water slurry, the combination which includes a mixing chamber having an inlet and an outlet, agitating and forwarding means arranged within the mixing chamber, a screw conveyer communicating with the mixing chamber inlet through a conduit having the lower end thereof formed of rubber, means arranged to flex the lower end of the conduit, and a water metering device adapted to deliver water to the mixing chamber at a point about the lower portion of the rubber conduit.

4. In a cement mixer for producing a slurry from water and cement powder, the combination which includes a mixing chamber having an inlet and an outlet, agitating and forwarding means arranged within the mixing chamber, a screw conveyer communicating with the mixing chamber inlet, a conduit having at least the lower portion thereof formed of a rubber-like material, said rubber-like conduit extending into the mixing chamber to a point where it is contacted by the mixing blades as they are rotated, and water metering means adapted to deliver water to the mixing chamber at a point near the cement inlet.

5. In a cement mixer for producing a slurry from water and cement powder, the combination which includes a mixing chamber having an inlet and an outlet, agitating and forwarding means arranged within the mixing chamber, a screw conveyer communicating with the mixing chamber through a conduit having at least the lower end portion formed of a rubber-like material, a water supply line adapted to direct a stream of water against the rubber-like portion of the conduit so as to flex the same.

RONALD P. LOWRY.